US007265349B2

(12) United States Patent
Park

(10) Patent No.: US 7,265,349 B2
(45) Date of Patent: Sep. 4, 2007

(54) METHOD AND APPARATUS FOR A MULTIPLE PART CAPILLARY DEVICE FOR USE IN MASS SPECTROMETRY

(75) Inventor: Melvin A. Park, Billerica, MA (US)

(73) Assignee: Bruker Daltonics, Inc., Billerica, MA (US)

(*) Notice: Subject to any disclaimer, the term of this patent is extended or adjusted under 35 U.S.C. 154(b) by 0 days.

(21) Appl. No.: 10/901,424

(22) Filed: Jul. 27, 2004

(65) Prior Publication Data

US 2005/0072916 A1 Apr. 7, 2005

Related U.S. Application Data

(63) Continuation of application No. 09/507,423, filed on Feb. 18, 2000, now Pat. No. 6,777,672.

(51) Int. Cl.
*B01D 59/44* (2006.01)
*H01J 49/04* (2006.01)

(52) U.S. Cl. ........................ 250/288; 250/281; 250/282

(58) Field of Classification Search ..................... None
See application file for complete search history.

(56) References Cited

U.S. PATENT DOCUMENTS 4,713,963 A 12/1987 Sharp
4,791,292 A 12/1988 Cooks et al.
4,994,165 A 2/1991 Lee et al.
5,114,439 A 5/1992 Yost et al.
RE34,757 E * 10/1994 Smith et al. ................ 204/452
5,352,892 A 10/1994 Mordehai et al.
5,495,108 A 2/1996 Apffel, Jr. et al.
5,504,327 A 4/1996 Sproch et al.
5,505,832 A 4/1996 Laukien et al.
5,736,741 A 4/1998 Bertsch et al.
5,750,988 A 5/1998 Apffel et al.
5,756,995 A * 5/1998 Maswadeh et al. ......... 250/288
5,856,671 A 1/1999 Henion et al.
5,917,184 A 6/1999 Carson et al.
5,965,883 A 10/1999 Lee et al.
5,975,426 A 11/1999 Myers
6,175,112 B1 1/2001 Karger et al.
6,207,954 B1 3/2001 Andrien, Jr. et al.
6,359,275 B1 3/2002 Bertsch et al.

* cited by examiner

*Primary Examiner*—Nikita Wells
(74) *Attorney, Agent, or Firm*—Ward & Olivo

(57) ABSTRACT

The present invention provides a multiple part capillary for use in mass analysis instruments. Specifically, a multiple part capillary comprising at least two capillary sections joined with airtight seal by a union for use in mass spectrometry (particularly with ionization sources) to transport ions between pressure regions of a mass spectrometer for analysis is described herein. Preferably, the capillary is useful to transport ions from an elevated pressure ionization source to a first vacuum region of a mass analysis system.

26 Claims, 11 Drawing Sheets

METHOD AND APPARATUS FOR A MULTIPLE PART CAPILLARY DEVICE FOR USE IN MASS SPECTROMETRY

CROSS-REFERENCE TO RELATED APPLICATIONS

This application is a continuation of application Ser. No. 09/507,423, filed on Feb. 18, 2000, now U.S. Pat. No. 6,777,672.

TECHNICAL FIELD OF THE INVENTION

The present invention relates generally to mass spectrometry and the analysis of chemical samples, and more particularly to capillaries for use in mass spectrometry. Described herein is a multiple part capillary for use in mass spectrometry (particularly with ionization sources) to transport ions from an ionization source to subsequent regions of a mass spectrometer for analysis therein.

BACKGROUND OF THE PRESENT INVENTION

The present invention relates to capillary tubes for use in mass spectrometry. Mass spectrometry is an important tool in the analysis of a wide range of chemical compounds. Specifically, mass spectrometers can be used to determine the molecular weight of sample compounds. The analysis of samples by mass spectrometry consists of three main steps—formation of ions from sample material, mass analysis of the ions to separate the ions from one another according to ion mass, and detection of the ions. A variety of means exist in the field of mass spectrometry to perform each of these three functions. The particular combination of means used in a given spectrometer determine the characteristics of that spectrometer.

To mass analyze ions, for example, one might use a magnetic (B) or electrostatic (E) analyzer. Ions passing through a magnetic or electrostatic field will follow a curved path. In a magnetic field the curvature of the path will be indicative of the momentum-to-charge ratio of the ion. In an electrostatic field, the curvature of the path will be indicative of the energy-to-charge ratio of the ion. If magnetic and electrostatic analyzers are used consecutively, then both the momentum-to-charge and energy-to-charge ratios of the ions will be known and the mass of the ion will thereby be determined. Other mass analyzers are the quadrupole (Q), the ion cyclotron resonance (ICR), the time-of-flight (TOF), and the quadrupole ion trap analyzers.

Before mass analysis can begin, however, gas phase ions must be formed from sample material. If the sample material is sufficiently volatile, ions may be formed by electron ionization (EI) or chemical ionization (CI) of the gas phase sample molecules. For solid samples (e.g. semiconductors, or crystallized materials), ions can be formed by desorption and ionization of sample molecules by bombardment with high energy particles. Secondary ion mass spectrometry (SIMS), for example, uses keV ions to desorb and ionize sample material. In the SIMS process a large amount of energy is deposited in the analyte molecules. As a result, fragile molecules will be fragmented. This fragmentation is undesirable in that information regarding the original composition of the sample—e.g., the molecular weight of sample molecules—will be lost.

For more labile, fragile molecules, other ionization methods now exist. The plasma desorption (PD) technique was introduced by Macfar lane et al. in 1974 (Macfarlane, R. D.; Skowronski, R. P.; Torgerson, D. F., *Biochem. Biophys. Res Commoun.* 60 (1974) 616). Macfarlane et al. discovered that the impact of high energy (MeV) ions on a surface, like SIMS would cause desorption and ionization of small analyte molecules, however, unlike SIMS, the PD process results also in the desorption of larger, more labile species—e.g., insulin and other protein molecules.

Lasers have been used in a similar manner to induce desorption of biological or other labile molecules. See, for example, VanBreeman, R. B.: Snow, M.: Cotter, R. J., *Int. J. Mass Spectrom. Ion Phys.* 49 (1983) 35; Tabet, J. C.; Cotter, R. J., *Anal. Chem.* 56 (1984) 1662; or Olthoff, J. K.; Lys, I.: Demirev, P.: Cotter, R. J., *Anal. Instrument.* 16 (1987) 93. Cotter et al. modified a CVC 2000 time-of-flight mass spectrometer for infrared laser desorption of involatile biomolecules, using a Tachisto (Needham, Mass.) model 215G pulsed carbon dioxide laser. The plasma or laser desorption and ionization of labile molecules relies on the deposition of little or no energy in the analyte molecules of interest. The use of lasers to desorb and ionize labile molecules intact was enhanced by the introduction of matrix assisted laser desorption ionization (MALDI) (Tanaka, K.; Waki, H.; Ido, Y.; Akita, S.; Yoshida, Y.; Yoshica, T., *Rapid Commun. Mass Spectrom.* 2 (1988) 151 and Karas, M.; Hillenkamp, F., *Anal. Chem.* 60 (1988) 2299). In the MALDI process, an analyte is dissolved in a solid, organic matrix. Laser light of a wavelength that is absorbed by the solid matrix but not by the analyte is used to excite the sample. Thus, the matrix is excited directly by the laser, and the excited matrix sublimes into the gas phase carrying with it the analyte molecules. The analyte molecules are then ionized by proton, electron, or cation transfer from the matrix molecules to the analyte molecules. This process, MALDI, is typically used in conjunction with time-of-flight mass spectrometry (TOFMS) and can be used to measure the molecular weights of proteins in excess of 100,000 daltons.

Atmospheric pressure ionization (API) includes a number of methods. Typically, analyte ions are produced from liquid solution at atmospheric pressure. One of the more widely used methods, known as electrospray ionization (ESI), was first suggested by Dole et al. (M. Dole, L. L. Mack, R. L. Hines, R. C. Mobley, L. D. Ferguson, M. B. Alice, *J. Chem. Phys.* 49, 2240, 1968). In the electrospray technique, analyte is dissolved in a liquid solution and sprayed from a needle. The spray is induced by the application of a potential difference between the needle (where the liquid emerges) and a counter electrode. By subjecting the emerging liquid to a strong electric field, it becomes charged, and as a result, it “breaks up” into smaller particles if the charge imposed on the liquid's surface is strong enough to overcome the surface tension of the liquid (i.e., as the particles attempt to disperse the charge and return to a lower energy state). This results in the formation of finely charged droplets of solution containing analyte molecules. These droplets further evaporate leaving behind bare charged analyte ions.

Electrospray mass spectrometry (ESMS) was introduced by Yamashita and Fein (M. Yamashita and M. B. Fein, *J. Phys. Chem.* 88, 4671, 1984). To establish this combination of ESI and MS, ions had to be formed at atmospheric pressure, and then introduced into the vacuum system of a mass analyzer via a differentially pumped interface. The combination of ESI and MS afforded scientists the opportunity to mass analyze a wide range of samples, and ESMS is now widely used primarily in the analysis of biomolecules (e.g. proteins) and complex organic molecules.

In the intervening years a number of means and methods useful to ESMS and API-MS have been developed. Specifically, much work has focused on sprayers and ionization chambers. In addition to the original electrospray technique, pneumatic assisted electrospray, dual electrospray, and nano electrospray are now also widely available. Pneumatic assisted electrospray (A. P. Bruins, T. R. Covey, and J. D. Henion, Anal. Chem. 59, 2642, 1987) uses nebulizing gas flowing past the tip of the spray needle to assist in the formation of droplets. The nebulization gas assists in the formation of the spray and thereby makes the operation of ESI easier. Nano electrospray (M. S. Wilm, M. Mann, *Int. J. Mass Spectrom. Ion Processes* 136, 167; 1994) employs a much smaller diameter needle than the original electrospray. As a result the flow rate of sample to the tip is lower and the droplets in the spray are finer. However, the ion signal provided by nano electrospray in conjunction with MS is essentially the same as with the original electrospray. Nano electrospray is therefore much more sensitive with respect to the amount of material necessary to perform a given analysis.

Many other ion production methods might be used at atmospheric or elevated pressure. For example, MALDI has recently been adapted by Victor Laiko and Alma Burlingame to work at atmospheric pressure (Atmospheric Pressure Matrix Assisted Laser Desorption Ionization, poster #1121, $4^{th}$ International Symposium on Mass Spectrometry in the Health and Life Sciences, San Francisco, Aug. 25–29, 1998) and by Standing et al. at elevated pressures (Time of Flight Mass Spectrometry of Biomolecules with orthogonal Injection+Collisional Cooling, poster #1272, $4^{th}$ International Symposium on Mass Spectrometry in the Health and Life Sciences, San Francisco, Aug. 25–29, 1998; and Orthogonal Injection TOFMS *Anal. Chem.* 71(13), 452A (1999)). The benefit of adapting ion sources in this manner is that the ion optics and mass spectral results are largely independent of the ion production method used.

An elevated pressure ion source always has an ion production region (wherein ions are produced) and an ion transfer region (wherein ions are transferred through differential pumping stages and into the mass analyzer). The ion production region is at an elevated pressure—most often atmospheric pressure—with respect to the analyzer. The ion production region will often include an ionization "chamber". In an ESI source, for example, liquid samples are "sprayed" into the "chamber" to form ions.

The design of the ionization chamber used in conjunction with API-MS has had a significant impact on the availability and use of these ionization methods with MS. Prior art ionization chambers are inflexible to the extent that a given ionization chamber can be used readily with only a single ionization method and a fixed configuration of sprayers. For example, in order to change from a simple electrospray method to a nano electrospray method of ionization, one had to remove the electrospray ionization chamber from the source and replace it with a nano electrospray chamber (see also, Gourley et al. U.S. Pat. No. 5,753,910, entitled Angled Chamber Seal for Atmospheric Pressure Ionization Mass Spectrometry). In a co-pending application, entitled, Ionization Chamber For Atmospheric Pressure Ionization, this problem is addressed by disclosing an API ionization chamber providing multiple ports for employing multiple devices in a variety of combinations (e.g., any type of sprayer, lamp, microscope, camera or other such device in various combinations). Further, any given sprayer may produce ions in a manner that is synchronous or asynchronous with the spray from any or all of the other sprayers. By spraying in an asynchronous manner, analyte from a multitude of inlets may be sampled in a multiplexed manner.

Analyte ions produced via an API method need to be transported from the ionization region through regions of differing pressures and ultimately to a mass analyzer for subsequent analysis (e.g., via time-of-flight mass spectrometry (TOFMS), Fourier transform mass spectrometry (FTMS), etc.). In prior art sources, this was accomplished through use of a small orifice or capillary tube between the ionization region and the vacuum region. An example of such a prior art capillary tubes is shown in FIG. 1. As depicted, capillary 7 comprises a generally cylindrical glass tube 2 having an internal bore 4. The ends of capillary 7 include a metal coating (e.g., platinum, copper, etc.) to form conductors 5 which encompass the outer surface of capillary 7 at its ends, leaving a central aperture 6 such that the entrance and exit to internal bore 3 are left uncovered. Conductors 5 may be connected to electrical contacts (not shown) in order to maintain a desired space potential at each end of capillary 7. In operation, a first electrode (one of conductors 5) of capillary 7 may be maintained at an extreme negative potential (e.g. −4,500V), while the other electrode (the other of conductors 5), which may form the first stage of a multi-stage lensing system for the final direction of the ions to the spectrometer, may be maintained at a positive potential (e.g., 160 volts).

It is often observed that the capillaries used in MS analysis acquire deposits over time. Therefore, through normal operation the capillaries need to be regularly cleaned or even replaced. To do so, the MS system must be turned off before the capillary can be removed—requiring the pumps to be shut down and the vacuum system to be broken—thereby rendering the system unavailable for hours and even days at a time.

More recently, Lee et al. U.S. Pat. No. 5,965,883 attempted to solve this problem in the manner shown by FIG. 2. Shown in FIG. 2 is capillary 8 which comprises an outer capillary sleeve 9 surrounding an inner capillary tube 10. Sleeve 9 has substantially cylindrical inner surface 11 and outer surface 14. Similarly, tube 10 has substantially cylindrical inner surface 12 and outer surface 13. The innermost channel, or bore, of capillary 8 is substantially formed by inner surface 12 of tube 10. Capillary 8 is substantially radially symmetrical about its central longitudinal axis 15 extending from an upstream end 16 to a downstream end 17. At each end, capillary 8 has conductive end caps 18 comprising the unitary combination of a tubular body having cylindrical inner surface 20 and outer surface 21 and an end plate 22 having inner surface 23 and outer surface 24 with a central aperture. The tubular body of end cap 18 encompasses and is in circumferential engagement with a reduced diameter portion 25 of sleeve 9 adjacent to the respective ends of capillary 8, such that the external diameter of end cap 18 substantially the same as the external diameter of sleeve outer surface 14.

In order to remove tube 10, end cap 18 at the upstream end of capillary 8 is first removed. A removal tool (not shown) is inserted into the tube as to engage the tube's inner surface 12. It is further suggested by the prior art that in order to remove tube 10 it may be necessary to apply a slight torque orthogonal to axis 15, or other appropriate means such as bonding a removal tool to the tube using an adhesive. Once the tube is withdrawn, a replacement tube may be inserted into sleeve 9. However, this too is difficult and cumbersome, requiring tools to remove and replace the inner capillary tube.

Such prior art designs for the transfer capillary have inherent limitations relating to geometry, orientation, and ease of use. The capillary according to these prior art designs is substantially fixed in the source. Only if the instrument—or at least the source—is vented to atmospheric pressure can the capillary be removed. The geometric relation of the capillary is therefore fixed with respect to the source and all its components. This implies that the ion production means—e.g. an electrospray needle, atmospheric pressure chemical ionization sprayer, or MALDI probe—must be positioned with respect to the capillary entrance. In order to change from one ion production means to another—e.g. from an electrospray needle to a nano electrospray needle—the first means must be removed from the vicinity of the capillary entrance and the second must then be properly positioned with respect to the capillary entrance. For any production means, there will be an optimum geometry between the means and the capillary entrance at which the ion current passing into the analyzer is maximized. To achieve this optimum, a positioning means must be provided for positioning the ion production means with respect to the capillary entrance. This might take the form of precision machined components, a translation stage on which the ion production means is mounted, or some other device. If the ion production means is required or desired to be remote from the source, a long, fixed length capillary would have to be produced and installed (in a fixed position) in the source.

Another limitation of prior art capillaries relates to the orientation of the capillary bore with respect to the ion production means. Such orientation can be important for the operation of the source. One major consideration in the operation of an electrospray source is the formation of large droplets from the analyte solution at the spray needle. Such droplets do not readily evaporate. If these droplets enter the capillary, they may cause the capillary to become contaminated with a residue of analyte molecules and salts. In view of this, Apfel et al. in U.S. Pat. Nos. 5,495,108 and 5,750,988 describe apparatuses for API sources wherein the axis of the bore of the capillary 110 is at an angle of 90° with respect the axis of the bore of the spray needle 111, as depicted in FIG. 3. According to Apfel et al., certain experimental conditions lead to the production of large droplets by the spray needle. These large droplets will move away from the spray needle along the axis of the sprayer. However, an electric field between the spray needle and the capillary will cause ions formed from the spray to move towards the capillary. In this way, the ions are separated from the spray droplets and the droplets do not enter the capillary. However, this orientation is fixed in the prior art source of Apfel. To change this orientation, one would have to move the spray needle.

Prior art capillaries are further limited in the geometry of the capillary bore. That is, prior art capillaries, as depicted in FIGS. 1-3, are substantially straight (i.e., cylindrically symmetric) and fixed (i.e., the geometry of the capillary and its bore is fixed at the time of manufacture).

Applicant has recognized the need for an ion transfer device or capillary which can be cleaned or replaced without the need to shut down the entire mass spectrometer in which it resides. The present invention allows for the removal of one or more sections of the capillary (for cleaning or replacement) without having to shut down the pumping system or the instrument to which it is attached. In addition, the capillary according to the present invention can, among other things, be made from different materials, take on different sizes, shapes or forms, as well as perform different functions.

The design of the multiple part capillary according to the present invention provides added versatility to the use of ionization chambers as well as to the use and performance of any new and existing ionization methods. Furthermore, the invention provides for interfacing with robotic sampling devices to provide a fully automated system for the analysis of a variety of chemical species efficiently and cost effectively.

SUMMARY OF THE INVENTION

The present invention relates generally to mass spectrometry and the analysis of chemical samples, and more particularly to capillaries for use therein. The invention described herein comprises an improved method and apparatus for transporting ions from a first pressure region in a mass spectrometer to a second region therein. More specifically, the present invention provides a multiple part capillary for more efficient use in mass spectrometry (particularly with ionization sources) to transport ions from the first pressure region to a second pressure region.

A first aspect of the present invention is to provide a capillary for use in an ion source having improved flexibility and accessibility over prior art designs. A capillary according to the invention consists of at least two sections joined together end to end such that gas and sample material in the gas can be transmitted through the capillary across a pressure differential. The capillary is intended for use in an ion source wherein ions are produced at an elevated pressure and transported by the capillary into a vacuum region of the source.

The present invention allows for the removal of one or more sections of the capillary (for cleaning or replacement) without having to shut down the pumping system of the instrument to which it is attached. These sections may be made of different materials—e.g., glass, metal, composite, etc.—which may be either electrically conducting or non-conducting. Also, each section of the capillary according to the invention does not have to be straight or rigid, rather, one or more of the sections may be flexible such that it (or they) can bend in any direction.

A further object of the invention is to provide a multiple part capillary which offers improved flexibility in its geometric orientation with respect to other devices in the ionization source—especially the ion production means. For example, the axis of the bore or "channel" of the capillary at the capillary entrance might be positioned at any angle with respect to the ion production means. This angle, as discussed in Apfel U.S. Pat. Nos. 5,495,108 and 5,750,988 can be important, for example, in the separation of spray droplets from desolvated analyte ions. Also according to the present invention, the entrance section of the capillary might be modified or exchanged before or during instrument operation to effect a change in the orientation of the entrance with respect to the ion production means or other device.

This flexibility applies to the translational position of the entrance of the capillary as well as its angular orientation. That is, the position of the entrance of the capillary might be changed before or during instrument operation by either modification or exchange of the first section of the capillary. This allows for the transmission of ions from a variety of locations either near or removed from the immediate location of the source.

Another object of the present invention is to provide a multipurpose multiple part capillary wherein the bore or "channel" of one or more of the sections of the multiple part capillary may comprise any useful geometry (i.e., straight, helical, wave-like, etc.). For instance, it may be particularly useful to have an inner channel of helical geometry. This will cause larger particles (e.g., droplets from electrospray) to collide with the walls of the capillary, while allowing smaller particles (e.g., fully desolvated electrosprayed ions) to pass through the capillary. Note that the geometry of the bore may be, but is not necessarily, related to the outer surface of the capillary. That is, a capillary might have a cylindrically symmetric outer surface but have an inner bore which is helical.

Yet another purpose of the present invention is to provide a simple and efficient method and apparatus for integrating two source assemblies. A complete ion source may include a multitude of sub-assemblies. For example, an ion source might include an ion production means sub-assembly and vacuum sub-assembly. The ion production means sub-assembly might include a spray needle, its holder, a translation stage, etc. The vacuum sub-assembly might contain pumps, pumping restrictions, and ion optics for guiding ions into the mass analyzer. In prior art sources and instruments, the capillary would be integrated entirely in one sub-assembly—the vacuum sub-assembly. As a result, significant effort is required in prior art systems to align the ion production means sub-assembly—specifically the spray needle—with the vacuum sub-assembly—specifically the capillary entrance. The multiple part capillary according to the present invention eases the integration of such sub-assemblies by including capillary sections in each of the sub-assembly. The sub-assemblies are integrated by joining the capillary sections together. Any necessary alignments are performed within a given sub-assembly—e.g. alignment of the spray needle with the first section of capillary.

It is a further purpose of the present invention to provide flexibility when using a particular mass spectrometer by providing efficient use of a plurality of ionization sources. For example, in combination with the ionization chamber described in a co-pending application entitled Ionization Chamber For Atmospheric Pressure Ionization, the present invention provides added flexibility for switching from one ionization source to another or from one sample to another. Specifically, the capillary according to the invention is capable of efficiently and accurately being used with multiple electrospray sources. In addition, the capillary according to the invention is useful in multiplexing.

Another purpose of the invention is to provide a multiple part capillary which can be used with chromatographic sample preparation (e.g., liquid chromatography, capillary electrophoresis, etc.). The effluent from such a chromatographic column may be injected directly or indirectly into one of the sprayers. A plurality of such chromatographic columns may be used in conjunction with a plurality of sprayers—for example one sprayer per column. The presence of analyte in the effluent of any given column might be detected by any appropriate mans, for example a UV detector. When analyte is detected in this way, the sprayer associated with the column in question is "turned on" so that while analyte is present the sprayer is producing ions but otherwise the sprayer does not. If analyte is present simultaneously at more than one sprayer, the sprayers are multiplexed, as discussed above.

Other objects, features, and characteristics of the present invention, as well as the methods of operation and functions of the related elements of the structure, and the combination of parts and economies of manufacture, will become more apparent upon consideration of the following detailed description with reference to the accompanying drawings, all of which form a part of this specification.

BRIEF DESCRIPTION OF THE DRAWINGS

A further understanding of the present invention can be obtained by reference to a preferred embodiment set forth in the illustrations of the accompanying drawings. Although the illustrated embodiment is merely exemplary of systems for carrying out the present invention, both the organization and method of operation of the invention, in general, together with further objectives and advantages thereof, may be more easily understood by reference to the drawings and the following description. The drawings are not intended to limit the scope of this invention, which is set forth with particularity in the claims as appended or as subsequently amended, but merely to clarify and exemplify the invention.

For a more complete understanding of the present invention, reference is now made to the following drawings in which.

DETAILED DESCRIPTION OF A PREFERRED EMBODIMENT

As required, a detailed illustrative embodiment of the present invention is disclosed herein. However, techniques, systems and operating structures in accordance with the present invention may be embodied in a wide variety of sizes, shaped, forms and modes, some of which may be quite different from those in the disclosed embodiment. Consequently, the specific structural and functional details disclosed herein are merely representative, yet in that regard, they are deemed to afford the best embodiment for purposes of disclosure and to provide a basis for the claims herein which define the scope of the present invention.

The following presents a detailed description of a preferred embodiment of the present invention, as well as some alternate embodiments of the invention. As discussed above, the present invention relates generally to the mass spectroscopic analysis of chemical samples and more particularly to mass spectrometry. Specifically, an apparatus and method are described for transport of ions between pressure regions within a mass spectrometer. Reference is herein made to the figures, wherein the numerals representing particular parts are consistently used throughout the figures and accompanying discussion.

Figure 4:
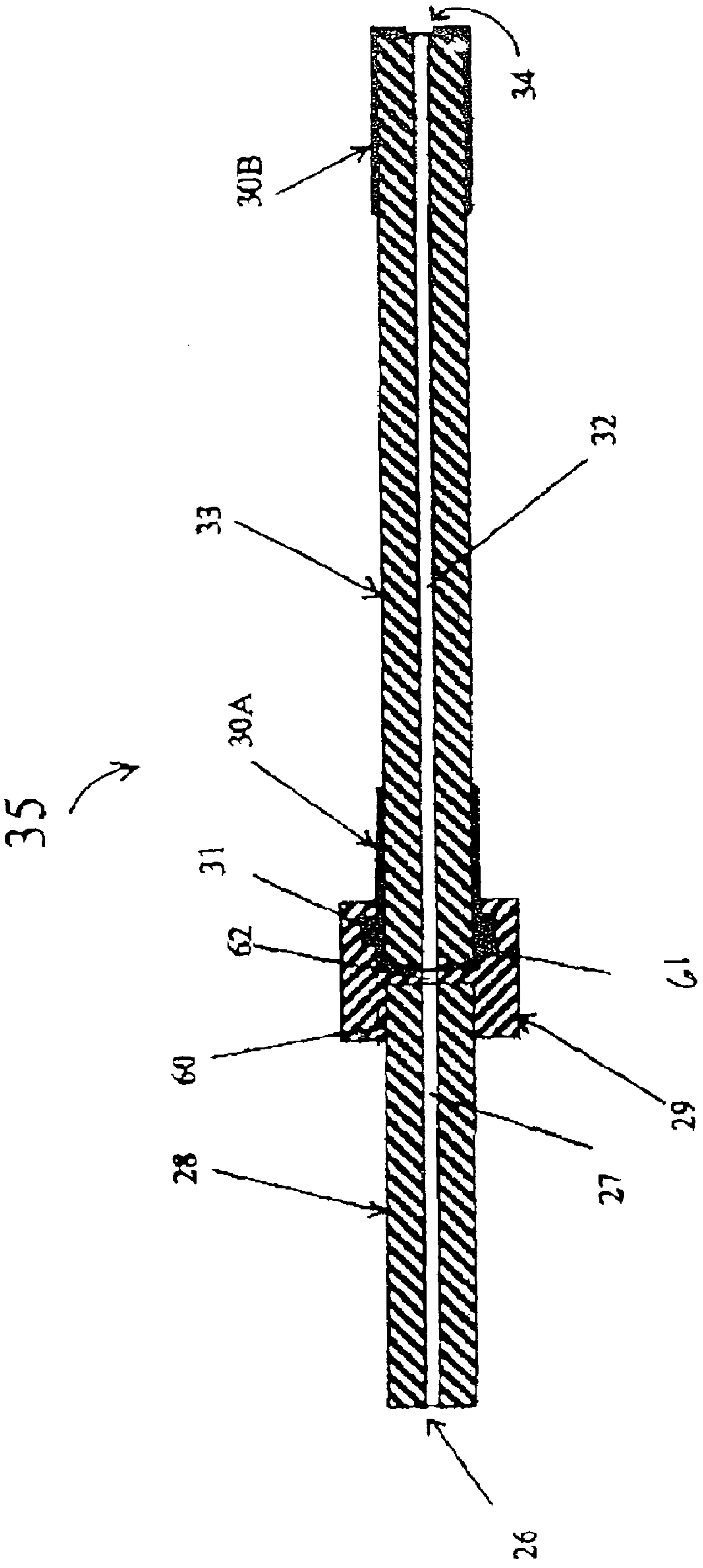
FIG. 4 shows a preferred embodiment of a multiple part capillary according to the present invention.

With reference first to FIG. 4, shown is multiple part capillary 35 according to a preferred embodiment of the present invention. As depicted in FIG. 4, multiple part capillary 35 comprises: first section 28 having capillary inlet end 26 and first channel 27; union 29 having o-ring 31; second section 33 having second channel 32 and capillary outlet end 34; and metal coatings 30A and 30B. According to the preferred embodiment, first section 28 is connected to second section 33 by union 29. In the preferred embodiment, union 29 is substantially cylindrical having two coaxial bores, 60 and 61, and through hole 62 of the same diameter as channels 26 and 32. In the preferred embodiment, section 28 and union 29 are composed of metal—e.g. stainless steel. The inner diameter of bore 60 and the outer diameter of section 28 are chosen to achieve a "press fit" when section 28 is inserted into bore 60. Because the press fit is designed to be tight, union 29 is thereby strongly affixed to section 28 and a gas seal is produced between union 29 and section 28 at the surface of the bore. The inner diameter of bore 61 is of slightly larger diameter than the outer diameter of section 33 (including metal coating 30A) so as to produce a "slip fit" between union 29 and section 33. A gas seal is established between bore 61 and section 33 via o-ring 31. Electrical contact between metal coating 30A, union 29, and section 28 via direct physical contact between the three. Through hole 62 allows for the transmission of gas from entrance end 26 through to exit end 34 of the capillary. Ideally, union 29 and sections 28 and 33 are formed in such a way as to eliminate any "dead volume" between these components. To accomplish this, the ends of sections 28 and 33 are formed to be flush with the inner surface of union 29. Note that the body of section 33—excluding metal coatings 30A and 30B—is composed of glass in the preferred embodiment. As a result, metal coating 30A—together with union 29 and section 28—can be maintained at a different electrical potential than metal coating 30B.

Alternatively, union 29, and sections 28 and 33 may be composed of a variety of materials conducting or nonconducting; the outer diameters of the sections may differ substantially from one another; the inner diameters of the sections may differ substantially from one another; either or both ends or any or all sections may be covered with a metal or other coating; rather than a coating, the ends or capillary sections may be covered with a cap composed of metal or other material; the capillary may be composed of more than two sections always with one fewer union than sections; and the union may be any means for removably securing the sections of capillary together and providing an airtight seal between these sections.

Each end of union 29 could comprise a generally cylindrical opening having an internal diameter slightly larger than the external diameter of the end of the capillary section which is to be inserted therein. In such an embodiment, a gas seal is made with each capillary section via an o-ring similar to o-ring 31. As a further alternative, one might use springs to accomplish electrical contact between union 29 and sections 28 and 33. In this case a conducting spring would be positioned in union 29 adjacent to o-ring 31.

Moreover, in a preferred embodiment of the capillary according to the invention, the length of first section 28 is less than (even substantially less than) the length of second section 33. More specifically, the dimensions of first section 28 and second section 33 are such that within a range of desired pressure differentials across capillary 35, a gas flow rate within a desired range will be achieved. For example, the length of second section 33 and the internal diameter of second channel 32 are such that the gas transport across second section 33 alone (i.e., with first section 28 removed) at the desired pressure differential will not overload the pumps which generate the vacuum in the source chamber of the system. This allows the removal (e.g., for cleaning or replacement) of first section 28 of capillary 35 without shutting down the pumping system of the mass spectrometer.

Figure 1:
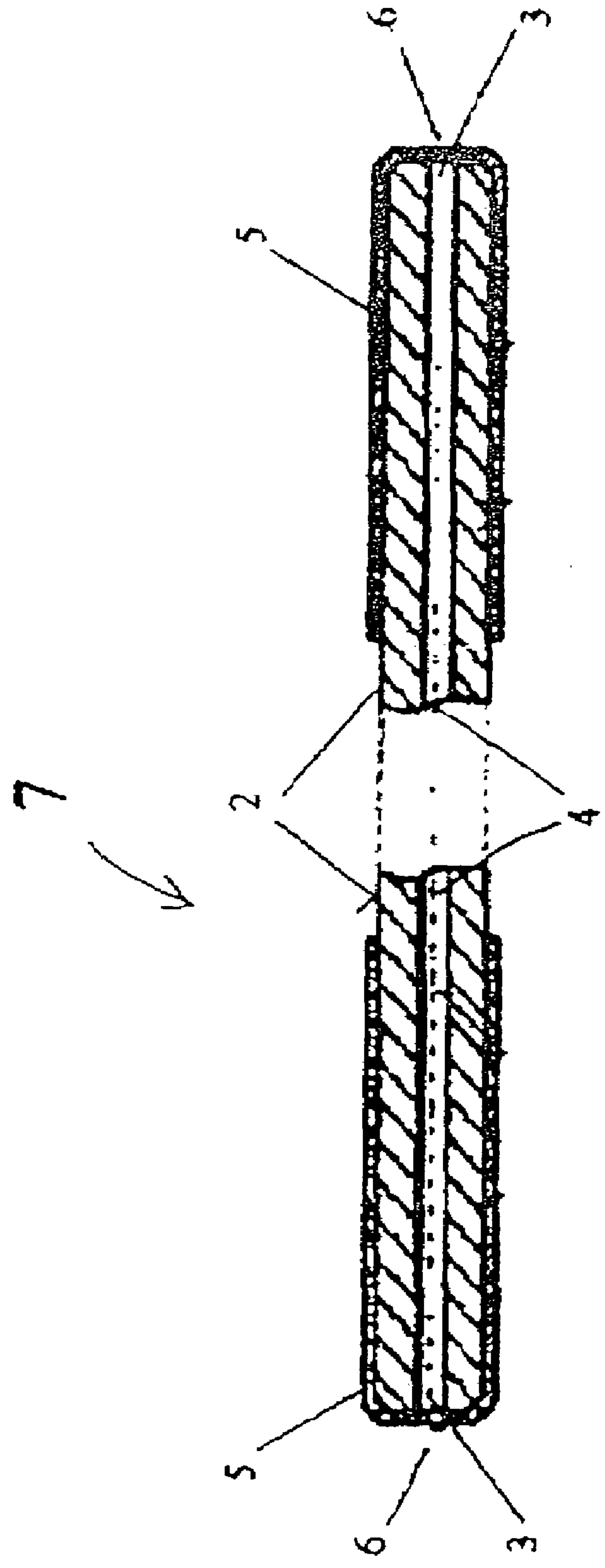
Figure 1 Prior Art
FIG. 1 shows a partial cut-away cross-sectional view of a prior art capillary comprising a unitary glass tube having a cylindrical outer surface and internal bore.
Figure 2:
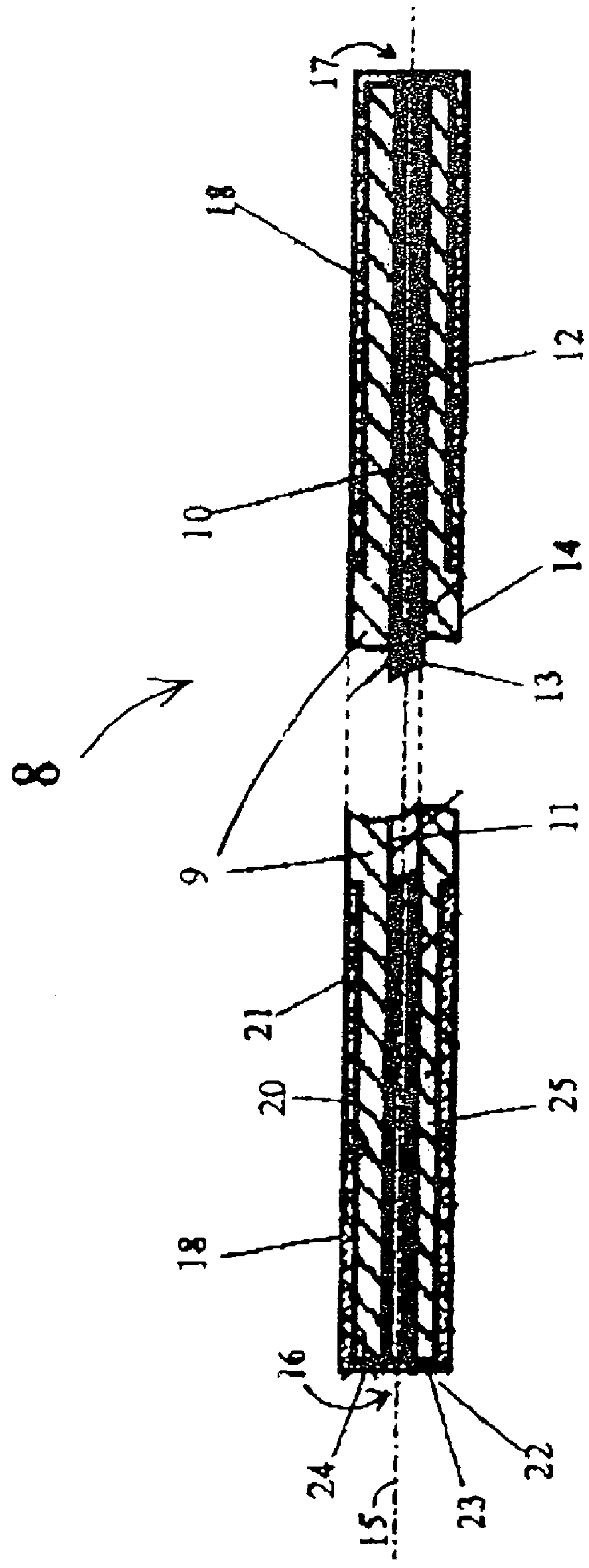
Figure 2 Prior Art
FIG. 2 shows a partial cut-away cross sectional view of another prior art capillary comprising a concentric outer capillary sleeve and inner capillary tube.
Figure 3:
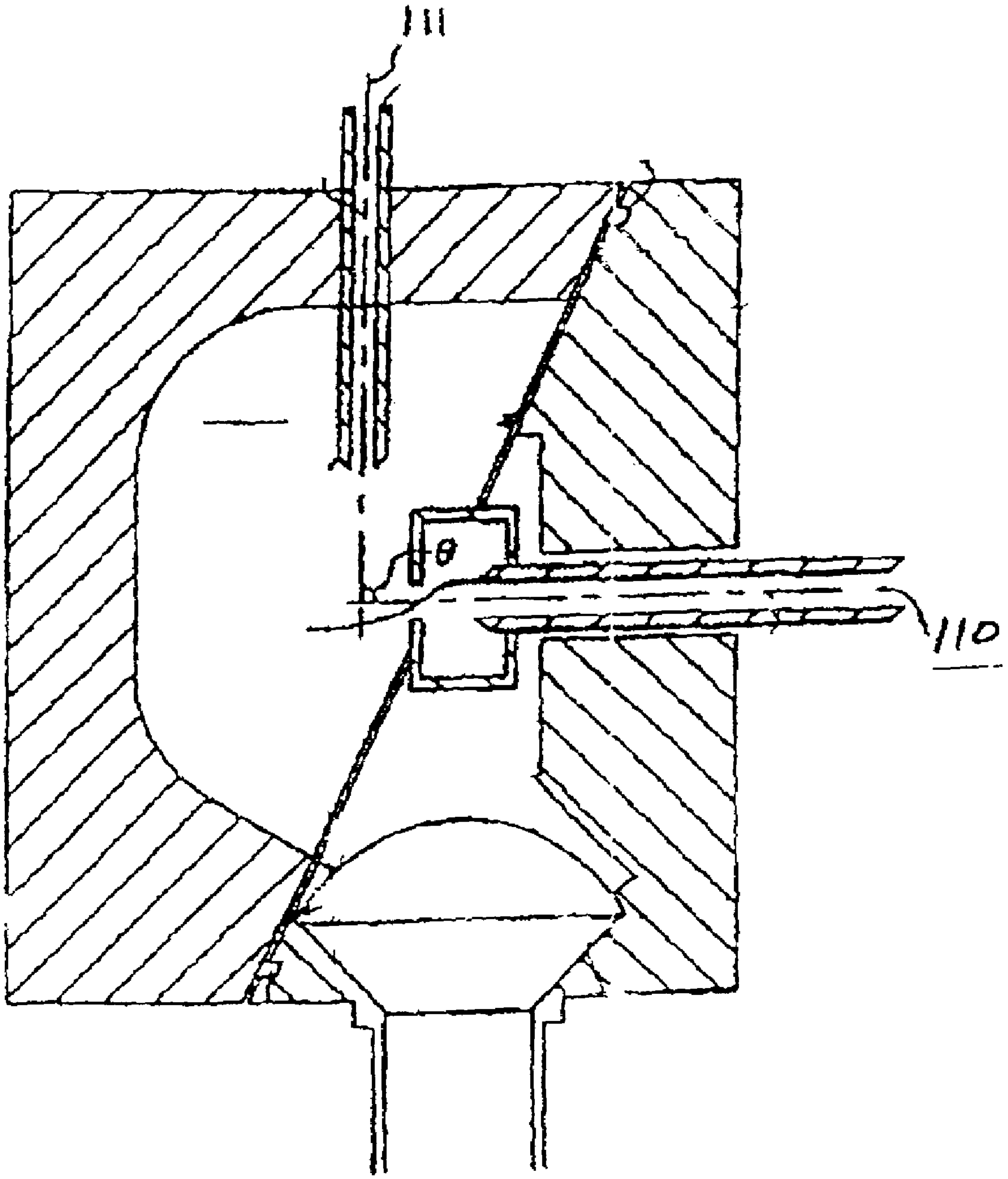
Prior Art FIG. 3
FIG. 3 shows a prior art spray chamber of a prior art electrospray ionization source wherein the channel of the spray needle is oriented orthogonal to the channel of the capillary.

While the prior art, as depicted in FIG. 2, attempts to accomplish removal, without shutting down the vacuum, it is difficult and cumbersome. As discussed previously, tools and adhesives may be required to remove and replace the capillary. The multiple part capillary according to the present invention provides a much simpler method and apparatus for accomplishing this result (i.e., without the use of adhesives, tools, etc.).

Figure 5:
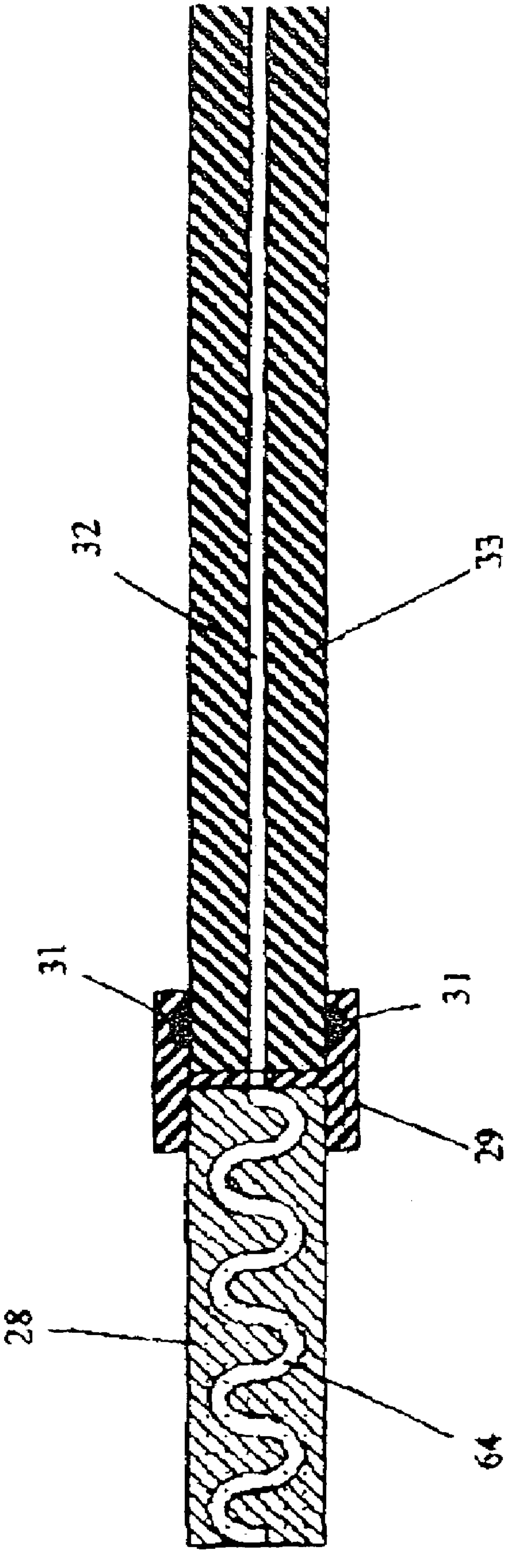
FIG. 5 shows an alternate embodiment of the multiple part capillary, wherein the channel of the first section comprises a helical structure.

Turning next to FIG. 5, an alternate embodiment of capillary 35 is shown wherein capillary section 28 has a serpentine internal channel 64. That is, the geometric structure of the internal channel of the capillary section is sinusoidal. Of course, other geometrical structures (i.e., helical, varying diameter, non-uniform, etc.) may be used in accordance with the invention. Having sinusoidal internal channel 64 causes larger particles—such as droplets from an electrospray—to collide with the walls of the channel and thereby not pass completely through the capillary. On the other hand, smaller particles—such as fully desolvated electrosprayed ions—do not collide with the walls and pass completely through the capillary. The curved (or sinusoidal) geometry of channel 64 also increases the length of the channel, which provides the advantage of permitting a larger diameter channel. Such a larger diameter channel may be advantageous in that it may provide greater acceptance of sampled species (e.g., electrosprayed ions, etc.) at a given flow rate and pressure differential. Alternatively, a sinusoidal—or any other geometry—channel may be used in either first section 28 or second section 33, or both.

Figure 6:
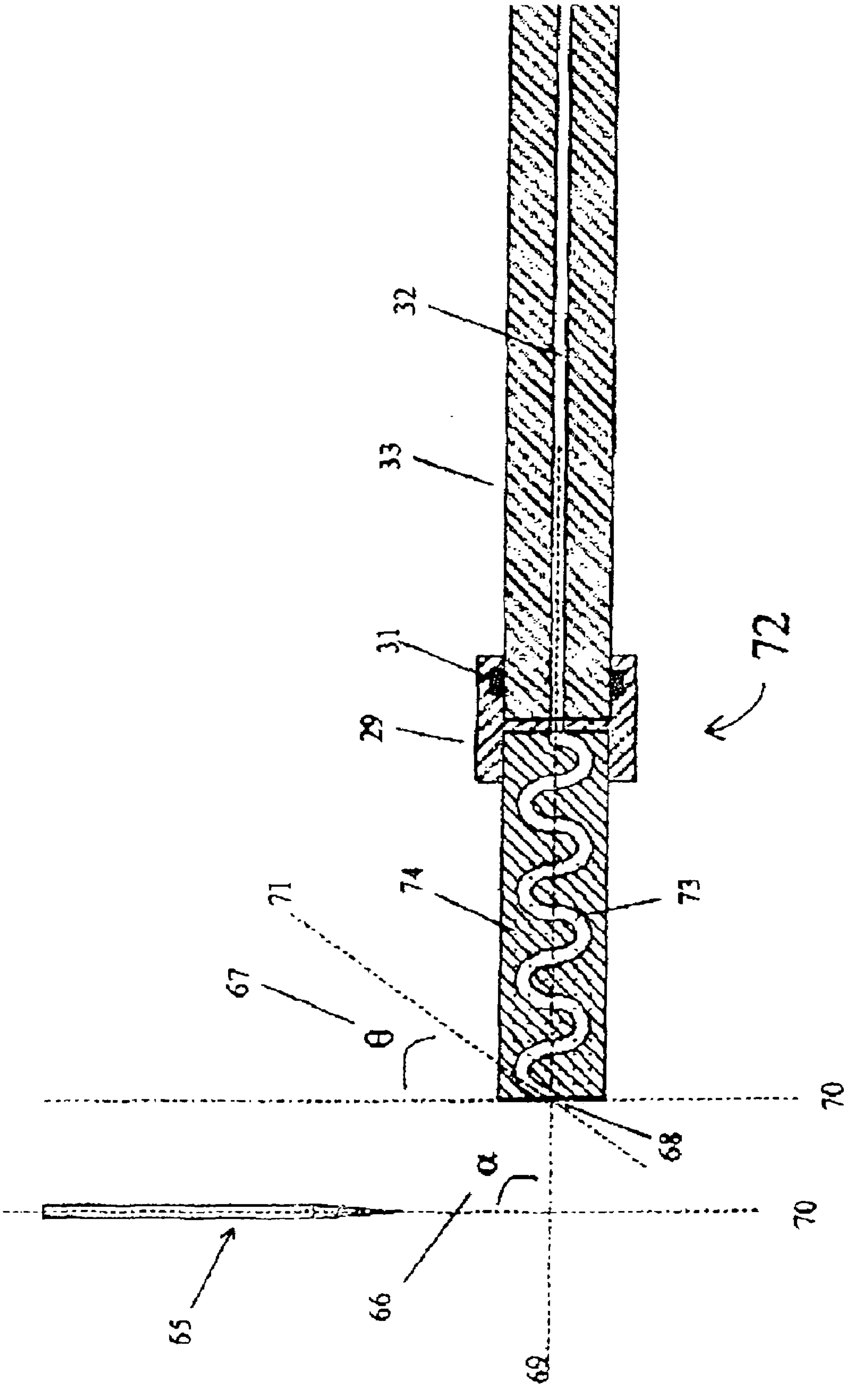
FIG. 6 shows an ESI sprayer needle oriented at an angle $\theta$ with respect to the inlet to the channel and an angle $\alpha$ with respect to the body of an embodiment of the multiple part capillary according to the present invention.

In accordance with the present invention, it is observed that the introduction of ions from an ionization means into the multiple part capillary of the invention may be accomplished at any angle of incidence between the ionization means and the inlet of the capillary. Referring now to FIG. 6, shown is an embodiment of the multiple part capillary according to the invention as used with an ESI sprayer 65 wherein axis 70 of sprayer 65 is oriented at angle $\alpha$ 66 with respect to axis 69 of the body of capillary 72. However, because channel 73 of capillary section 74 is curved, angle $\theta$ 67 between sprayer axis 70 and axis 71 of channel entrance 68 can be substantially different than angle $\alpha$ 66. The embodiment shown in FIG. 6 demonstrates that the capillary entrance angle $\alpha$ 66 may be any angle from 0° and 180°. The specific angle selected is dependent upon, among other things, the sample species being tested, the ionization source used, etc. As discussed above, the electrospray process results in the formation of charged droplets and molecular ions. The presence of large droplets in the spray can result in contamination of the capillary and generally poor instrument performance. One way of limiting the influence of large droplets on instrument performance is to spray away from the capillary entrance. That is, the spray needle is oriented so that it is not pointed directly at the capillary entrance. Large droplets formed in a source with such a geometry will tend to move along the axis of the spray needle and not enter the capillary, whereas desolvated ions will be attracted to the capillary entrance by the electrostatic field between the spray needle and the capillary. Thus, in the embodiment of FIG. 6, smaller angles α 66 and θ 67 will tend to reduce the fraction of droplets that enter the capillary.

In any case, the sinusoidal geometry of channel 73 tends to limit the contamination of capillary 72 due to large droplets to section 74. Large droplets which enter the capillary will tend to strike the walls of channel 73 and not pass through to section 33. Section 74 can be removed from the system—by pulling it off along axis 69—and cleaned without necessarily shutting the instrument or its vacuum system off.

Figure 7:
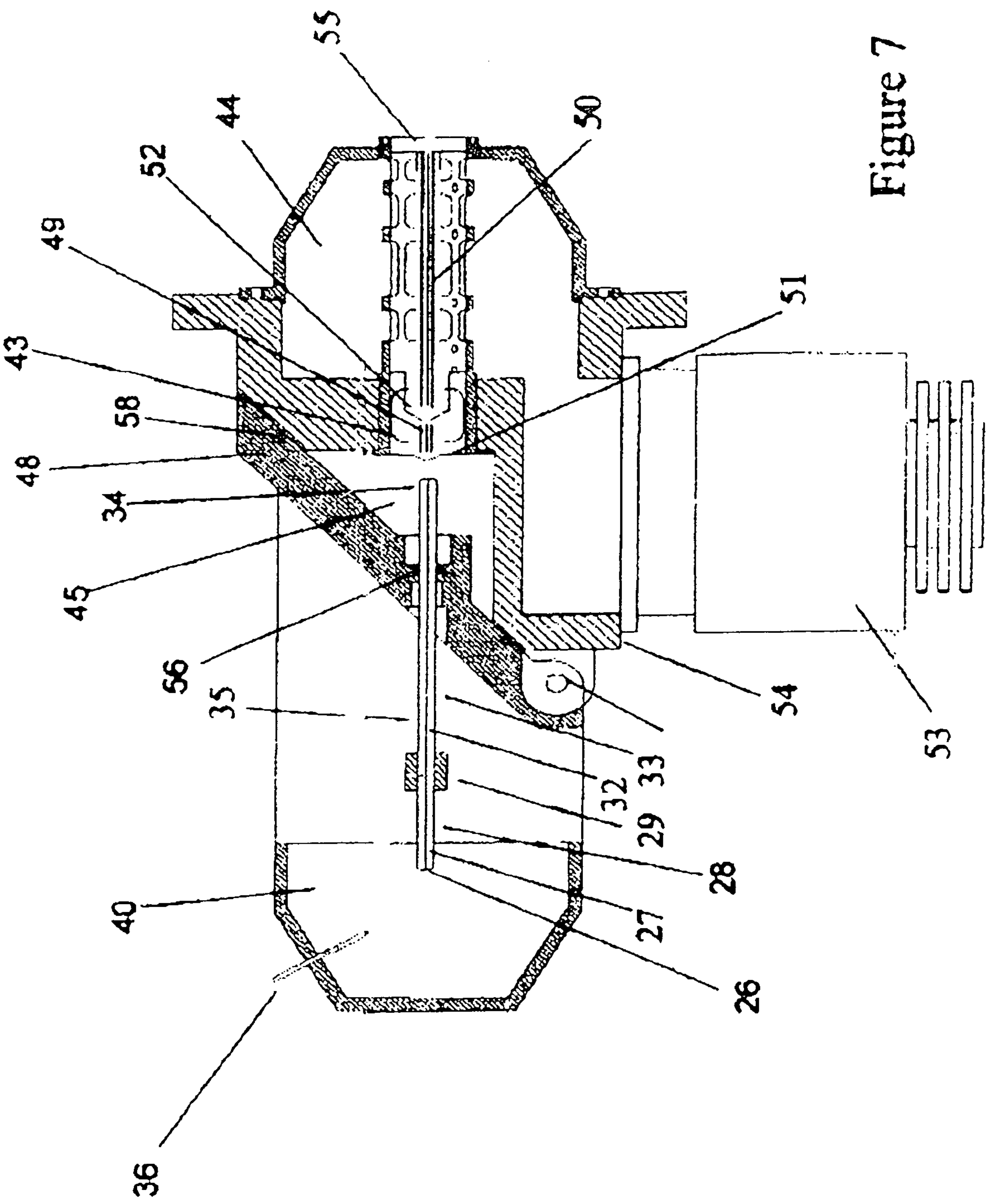
FIG. 7 shows an embodiment of the multiple part capillary according to the present invention as used with an ESI ionization source.

Depicted in FIG. 7 is an ionization source which incorporates the multiple part capillary of the invention where the ion production means is an ESI sprayer device, shown as spray needle 36 in spray chamber 40. During normal operation of a preferred embodiment with an ESI source, sample solution is formed into droplets at atmospheric pressure by spraying the sample solution from spray needle 36 into spray chamber 40. The spray is induced by the application of a high potential between spray needle 36 and entrance 26 of first capillary section 28 within spray chamber 40. Sample droplets from the spray evaporate while in spray chamber 40 thereby leaving behind an ionized sample material (i.e., sample ions). These sample ions are accelerated toward capillary inlet 26 of channel 27 by an electric field generated between spray needle 36 and inlet 26 of first section 28 of capillary 35. These ions are transported through first channel 27 into and through second channel 32 to capillary outlet 34. As described above with regard to FIG. 4, first section 28 is joined to second section 33 in a sealed manner by union 29. The flow of gas created by the pressure differential between spray chamber 40 and first transfer region 45 further causes the ion to flow through the capillary channels from the ionization source toward the mass analyzer.

Still referring to FIG. 7, first transfer region 45 is formed by mounting flange 48 on source block 54 where a vacuum tight seal is formed between flange 48 and source block 54 by o-ring 58. Capillary 35 penetrates through a hole in flange 48 where another vacuum tight seal is maintained (i.e., between flange 48 and capillary 35) by o-ring 56. A vacuum is then generated and maintained in first transfer 45 by a pump (e.g., a roughing pump, etc., not shown). The inner diameter and length of capillary 35 and the pumping speed of the pump are selected to provide as high a rate of gas flow through capillary 35 as reasonably possible while maintaining a pressure of 1 mbar in the first transfer region 45. A higher gas flow rate through capillary 35 will result in more efficient transport of ions.

Next, as further shown in FIG. 7, first skimmer 51 is placed adjacent to capillary exit 34 within first transfer region 45. An electric potential between capillary outlet end 34 and first skimmer 51 accelerates the sample ions toward first skimmer 51. A fraction of the sample ions then pass through an opening in first skimmer 51 and into second pumping region 43 where pre-hexapole 49 is positioned to guide the sample ions from the first skimmer 51 to second skimmer 52. Second pumping region 43 is pumped to a lower pressure than first transfer region 45 by pump 53. Again, a fraction of the sample ions pass through an opening in second skimmer 52 and into third pumping region 44, which is pumped to a lower pressure than second pumping region 43 via pump 53.

Once in third pumping region 44, the sample ions are guided from second skimmer 52 to exit electrodes 55 by hexapole 50. While in hexapole 50 ions undergo collisions with a gas (i.e., a collisional gas) and are thereby cooled to thermal velocities. The ions then reach exit electrodes and are accelerated from the ionization source into the mass analyzer for subsequent analysis.

Figure 8:
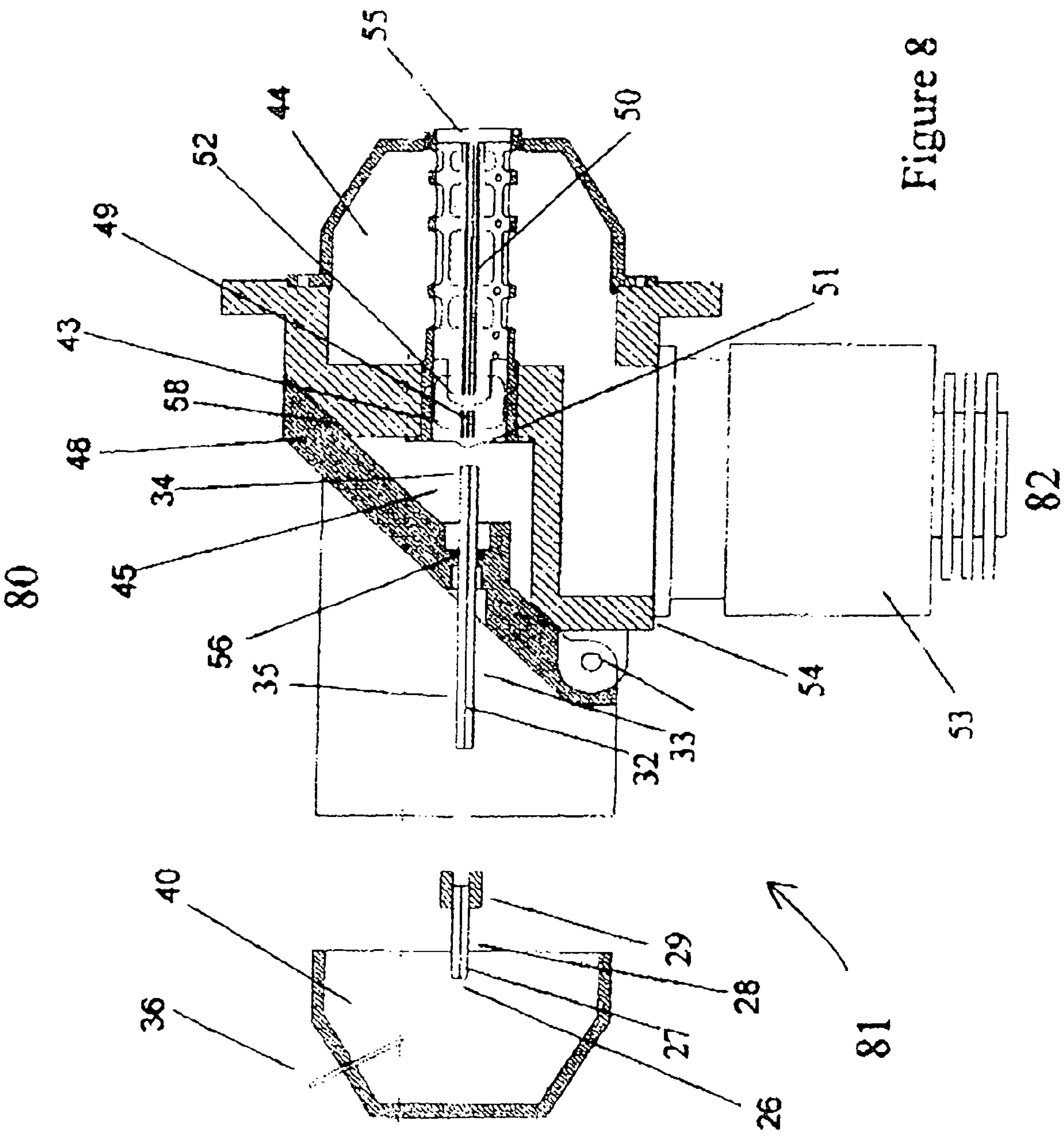
FIG. 8 shows a multiple part capillary according to the present invention as a means for integrating two source sub-assemblies.

Another purpose of the present invention is to provide a simple and efficient method and apparatus for integrating two source assemblies. As depicted in FIG. 8, a complete ion source may include a multitude of sub-assemblies. For example, ion source 80 includes ion production means sub-assembly 81 and vacuum sub-assembly 82. The ion production means sub-assembly includes, among other things, spray chamber 40 and spray needle 36. The vacuum sub-assembly includes among other things, pump 53, pumping restrictions 51 and 52, and ion optical elements 49–52 and 55 for guiding ions into the mass analyzer. In prior art sources and instruments, the capillary would be integrated entirely in one sub-assembly—the vacuum sub-assembly. As a result, significant effort is required in prior art systems to align the ion production means sub-assembly—specifically the spray needle—with the vacuum sub-assembly—specifically the capillary entrance. The multiple part capillary according to the present invention can be used to ease the integration of such sub-assemblies by including capillary sections in each of the sub-assembly. In the embodiment of FIG. 8, capillary section 28 is an integral component of ion production means sub-assembly 81 and capillary section 33 is an integral component of vacuum sub-assembly 82. Sub-assemblies 81 and 82 are integrated in part by joining capillary sections 28 and 33 together via union 29. Any necessary alignments are performed within a given sub-assembly—e.g. alignment of spray needle 36 with entrance 26 of channel 27. In alternate embodiments, any variety of sub-assemblies might be integrated, in part or in whole, by including capillary sections in these sub-assemblies and subsequently joining these capillary sections together as discussed with respect to FIG. 8. Further, any number of sub-assemblies with any variety of functions might be used. Such functions might include ion production, desolvation of spray droplets via a heated capillary section, ion transfer to the mass analyzer, etc. Clearly, any type of atmospheric pressure ionization means—including ESI, API MALDI, atmospheric pressure chemical ionization, nano electrospray, pneumatic assist electrospray, etc.—could be assembled into a source in this way.

Figure 9:
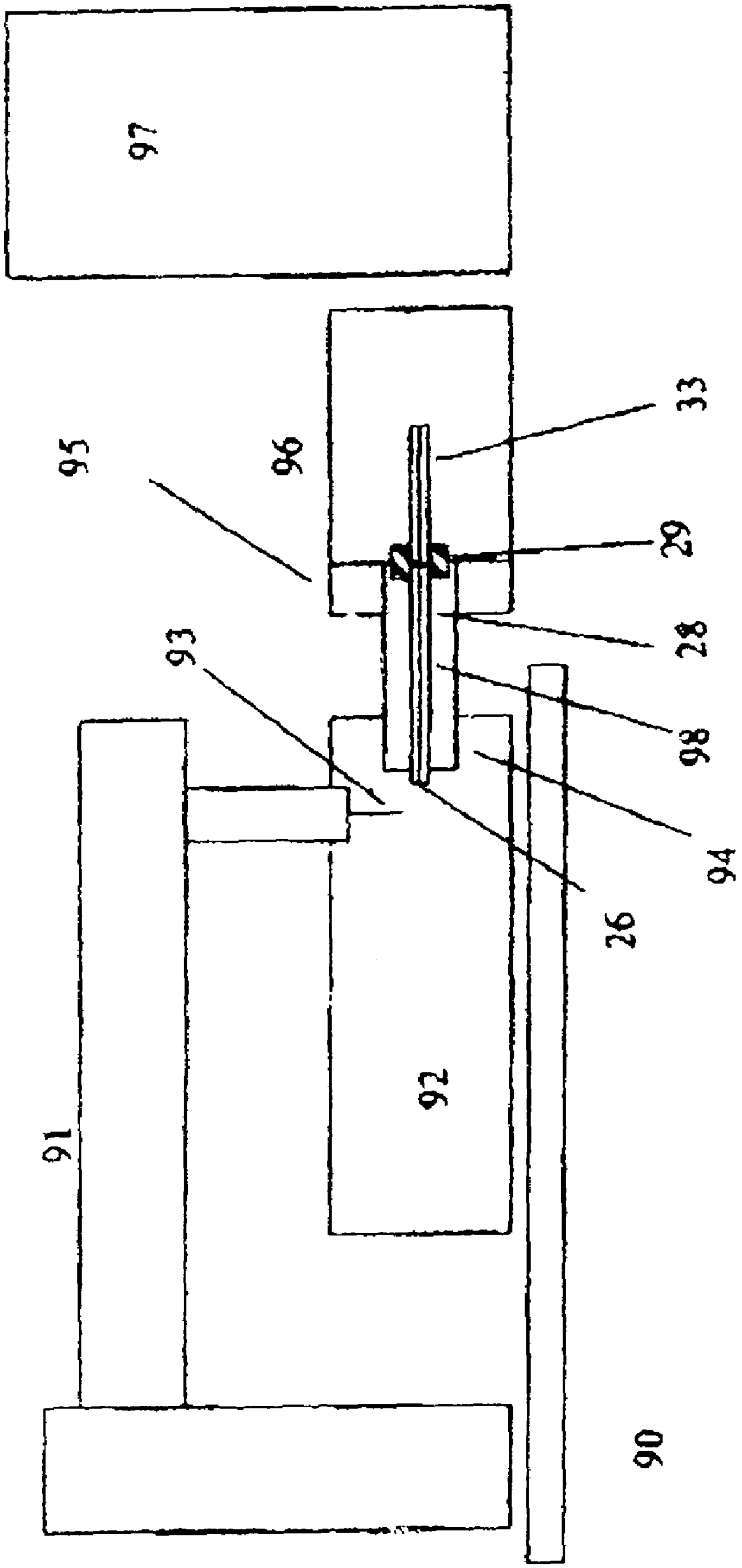
FIG. 9 shows the multiple part capillary according to the present invention as a means for integrating a sample preparation robot with an API source for mass spectrometry.

The capillary according to the present invention might also be used to transport ions from ionization means remote from the instrument. This is exemplified by the embodiment of FIG. 9. Shown in FIG. 9 is an embodiment of the multiple part capillary according to the invention as used for integrating a sample preparation robot with an Atmospheric Pressure Ionization (API) source. Specifically, the system shown comprises, among other things: robot 90; robot arm 91; sample tray (not shown); source tray 92; sprayer 93; multiple part capillary 98 comprising first section 28 having inlet 26, second section 33 having outlet 34, and union 29; gas transport line 94; source cover 95; vacuum sub-assembly 96; and mass analyzer 97.

Robots such as in the embodiment of FIG. 9—for example, a Gilson 215 Liquid Handler Robot—consist of a robot arm—e.g. arm 91—used to manipulate samples, and "trays" of samples and sample containers. The robot arm is used to move samples, solutions, and reactants from one container—i.e. tubes, vials, or microtiter wells—to another. By mixing analyte, solvents, and reactants in a predefined way, the robot can be used to prepare samples for subsequent analysis. As depicted in FIG. 9, sample spray and ionization would occur within robot 90 and only ions would be transported—via multiple part capillary 98—to mass analyzer 97. In the particular embodiment shown, a specially prepared source tray 92 is used. Sample is obtained by robot 90 from a sample tray by sucking solution into sprayer 93. Robot arm 91 then moves sprayer 93 to source tray 92 and to a predefined location near entrance 26 of capillary 98. Drying gas can be transported into source tray from vacuum sub-assembly 96 via a gas transport line 94. Sprayer 93 is attached to robot arm 91 and set at ground potential (of course, any ESI sprayer may be used (e.g., pneumatically assisted sprayers, nanosprayer needles, etc.)), while inlet 26 to first section 28 of capillary 98 set at high voltage. This potential difference between sprayer 94 and first section 28 induces the spray of the sample solution and production of analyte ions.

Figure 10:
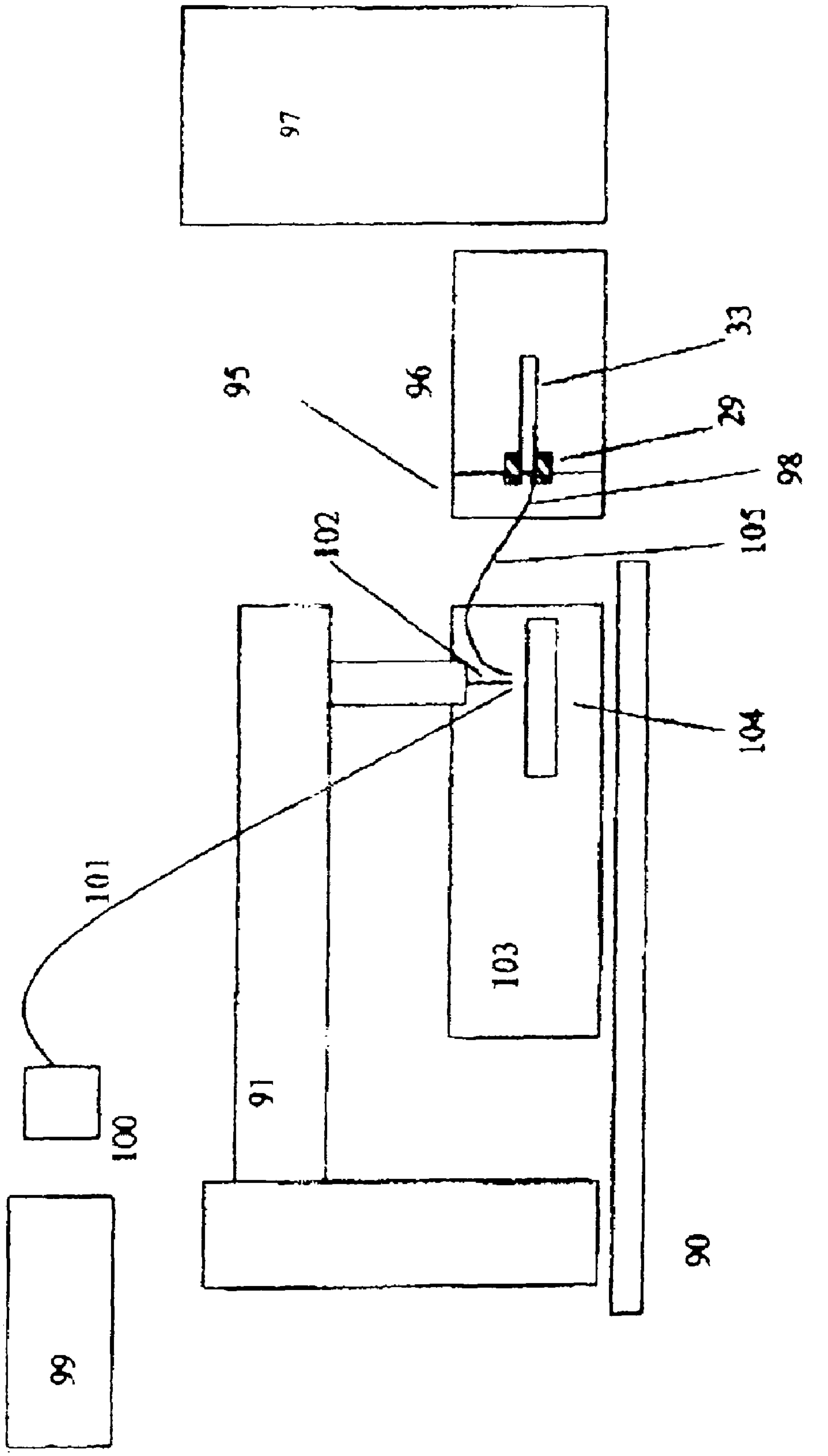
FIG. 10 shows an embodiment of the multiple part capillary according to the present invention as a means for integrating a sample preparation robot with an elevated pressure MALDI source for mass spectrometry.

The capillary according to the present invention is also useful in transporting ions from varying locations during operation. Turning to FIG. 10, shown is an embodiment of the multiple part capillary according to the invention as a means for integrating a sample preparation robot with an elevated pressure MALDI source for use in mass spectrometry. The system depicted in FIG. 10 comprises a laser 99, attenuator 100, fiber optic 101, robot 90 having robot arm 91 for control and movement of sample probe 102, MALDI sample tray 103, sample holder 104, alternative embodiment of capillary 98 having first section 105, second section 33 joined by union 29, ionization source cover 95, vacuum sub-assembly 96, and mass analyzer 97.

The alternative embodiment of the multiple part capillary of the invention as shown in FIG. 10 comprises a flexible first section 105 such that its inlet end may be moved by robot arm 91 to various positions for acceptance of the MALDI samples to be analyzed. As depicted in FIG. 10, sample preparation and ionization are both performed by robot 90 such that only ions would be transported through the multiple part capillary 98 to vacuum sub-assembly 96 and ultimately to mass analyzer 97. Specifically, robot arm has attached at its end sample probe 102, and fiber optic 101 for directing the laser beam from laser 99 onto sample holder 104 to ionize samples thereon. The ions formed by the laser beam hitting the samples on sample holder 104 are then carried by the gas flow into and through capillary 98 to the differential pumping region of vacuum sub-assembly 96, where additional ion optics (not shown) are designed to further transport the ions from outlet end of capillary 98 to mass analyzer 97 for subsequent analysis.

Figure 11:
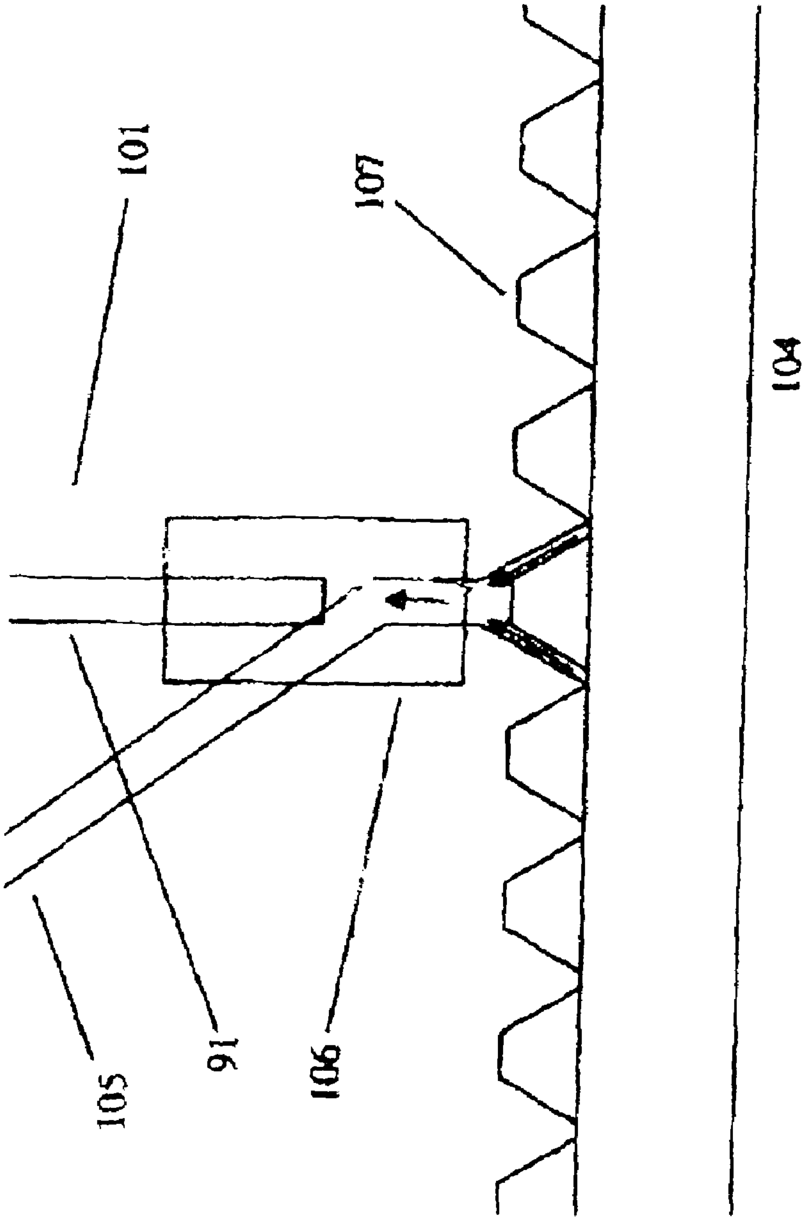
FIG. 11 shows a close-up view of the use of the multiple part capillary with a MALDI probe in accordance with the present invention.

As shown in FIG. 11, which depicts an embodiment of the multiple part capillary for use with a MALDI probe, the multiple part capillary according to the invention provides a means for integrating a sample preparation robot with MALDI mass analysis. Shown in FIG. 11 are capillary 105, robot arm 91, receptacle 106, fiber optic 101, and sample plate 104 with raised conical formations 107 onto which samples (not shown) are deposited. Sample plate 104 and the conical formations form a unitary device composed of conducting material—e.g. stainless steel. In this alternate embodiment, capillary section 105 optionally comprises a specially shaped orifice which fits over cone-shaped sample holder formations 107 (one at a time) in such a way that gas flowing through capillary 98 readily captures the ions formed from the sample by laser desorption ionization. Optionally, a potential may be applied between sample carrier 104 and capillary 78 section 105 to help draw ions into the channel of capillary 78 section 105. Also, fiber optic 101 might be adjusted via piezo electrics or other mechanics to direct the laser beam to any region of the specific cone-shaped sample of samples 82 to be ionized Optionally, this redirecting of the laser beam may occur during the ionization process such that the entire sample is ionized.

While the present invention has been described with reference to one or more preferred embodiments, such embodiments are merely exemplary and are not intended to be limiting or represent an exhaustive enumeration of all aspects of the invention. The scope of the invention, therefore, shall be defined solely by the following claims. Further, it will be apparent to those of skill in the art that numerous changes may be made in such details without departing from the spirit and the principles of the invention. It should be appreciated that the present invention is capable of being embodied in other forms without departing from its essential characteristics.

What is claimed is:

1. A mass spectrometer comprising:

an ion source;

at least one vacuum region;

a mass analyzer; and a removable interface between said ion source and said vacuum region allowing ions to be delivered from said ion source into said vacuum region;

wherein said removable interface comprises means for removably interfacing first and second capillary sections and means for substantially maintaining low pressure conditions within said vacuum regions upon decoupling of said interface; and wherein said interfaces are in electrical contact.

2. A mass spectrometer according to claim 1, wherein said ion source produces ions using an ionization method selected from the group consisting of atmospheric pressure ionization (API), electrospray ionization (ESI), desorption electrospray ionization (DESI), pneumatic assisted electrospray ionization, electron impact, fast atom bombardment ionization (FAB), chemical ionization, matrix-assisted laser desorption/ionization (MALDI), secondary ion mass spectrometry (SIMS), plasma desorption, and liquid chromatography.

3. A mass spectrometer according to claim 1, wherein said mass analyzer is selected from the group consisting of a quadrupole mass analyzer, a time-of-flight mass analyzer, an ion trap mass analyzer, an ion cyclotron resonance mass analyzer, and a magnetic sector mass analyzer.

4. A mass spectrometer according to claim 1, wherein said removable interface comprises first and second openings, wherein said first opening interfaces with said first capillary section comprising an outlet end and an inlet end, wherein said first opening is oriented to interface with said outlet end of said capillary, wherein said second opening interfaces with said second capillary section comprising an outlet, and wherein said second opening is oriented to interface with said inlet end.

5. A mass spectrometer according to claim 4, wherein the axis of said capillary sections may be placed at any angle with respect to said ion source.

6. A mass spectrometer according to claim 4, wherein said capillary sections are constructed from a flexible material.

7. A mass spectrometer according to claim 4, wherein said capillary sections are constructed from a rigid material.

8. A mass spectrometer according to claim 4, wherein said removable interface and said first capillary section are at different electrical potentials.

9. A mass spectrometer according to claim 1, wherein said electrical contact is established between said capillary sections and said interface by conductive coatings on said capillary sections.

10. A mass spectrometer according to claim 1, wherein said electrical contact is established between said capillary sections and said interface using electrically conductive springs.

11. A mass spectrometer according to claim 1, wherein said inlet of said first capillary section and said outlet of said second capillary section are adjacent to said removable interface.

12. A mass spectrometer according to claim 1, wherein said removable interface further comprises a union having first and second openings and a channel therethrough, said union configured to removably interface said first capillary section to said second capillary section, such that ions may be delivered from said source region into said first vacuum region through said first and second capillary sections.

13. A system for mass spectroscopic analysis, wherein said system comprises:

an ion source subassembly;

one or more vacuum subassemblies;

a mass analysis subassembly;

at least one capillary assembly; and a removable interface between said capillary assembly and said subassemblies;

wherein said capillary assembly comprises first and second capillary sections, and a union having first and second openings, said union configured to removably interface said first capillary section to said second capillary section such that ions may be delivered between any of said subassemblies, and provide a substantially airtight seal between said subassemblies;

wherein a plurality of said subassemblies may be integrated together by connecting at least one said capillary assembly to said subassemblies; and wherein said interfaces are in electrical contact.

14. A system according to claim 13, wherein said capillary assembly comprises a plurality of capillary sections.

15. A system according to claim 13, wherein said capillary assembly is constructed of a flexible material.

16. A system according to claim 13, wherein said capillary assembly is constructed of a rigid material.

17. A system according to claim 13, wherein said mass analysis subassembly comprises a mass analyzer selected from the group consisting of a quadrupole mass analyzer, a time-of-flight mass analyzer, an ion trap mass analyzer, an ion cyclotron resonance mass analyzer, and a magnetic sector mass analyzer.

18. A system according to claim 13, wherein said ion source subassembly comprises an ion source selected from the group consisting of an atmospheric pressure ionization (API) source, an electrospray ionization (ESI) source, a desorption electrospray ionization (DESI) source, a pneumatic assisted electrospray ionization source, an electron impact source, a fast atom bombardment ionization (FAB) source, a chemical ionization source, a matrix-assisted laser desorption/ionization (MALDI) source, secondary ion mass spectrometry (SIMS) source, a plasma desorption source, and a liquid chromatography source.

19. A system according to claim 13, wherein the ends of said capillary assembly are adjacent to said interface.

20. A mass spectrometer comprising:

an ion source;

at least one vacuum region;

a mass analyzer; and a removable interface between said ion source and said vacuum region allowing ions to be delivered from said ion source into said vacuum region;

wherein said removable interface for substantially maintaining low pressure conditions within said vacuum regions upon decoupling of said interface; and wherein said removable interface further comprises a union having first and second openings and a channel therethrough, said union configured to removably interface a first interface to a second interface, such that ions may be delivered from said ion source into said vacuum region through said first and second interfaces.

21. A mass spectrometer according to claim 20, wherein said ion source produces ions using an ionization method selected from the group consisting of atmospheric pressure ionization (API), electrospray ionization (ESI), desorption electrospray ionization (DESI), pneumatic assisted electrospray ionization, electron impact, fast atom bombardment ionization (FAB), chemical ionization, matrix-assisted laser desorption/ionization (MALDI), secondary ion mass spectrometry (SIMS), plasma desorption, and liquid chromatography.

22. A mass spectrometer according to claim 20, wherein said mass analyzer is selected from the group consisting of a quadrupole mass analyzer, a time-of-flight mass analyzer, an ion trap mass analyzer, an ion cyclotron resonance mass analyzer, and a magnetic sector mass analyzer.

23. A mass spectrometer according to claim 20, wherein said removable interface and said first interface are at different electrical potentials.

24. A mass spectrometer according to claim 20, wherein electrical contact is established between said interfaces by conductive coatings on said interfaces.

25. A mass spectrometer according to claim 20, wherein electrical contact is established between said interfaces using electrically conductive springs.

26. A mass spectrometer according to claim 20, wherein said inlet of said first interface and said outlet of said second interface are adjacent to said removable interface.

* * * * *